Oct. 6, 1953 P. J. PRESSLER 2,654,492
SKID ARRANGEMENT FOR HAULAWAY VEHICLES
Filed Dec. 28, 1950 2 Sheets-Sheet 1
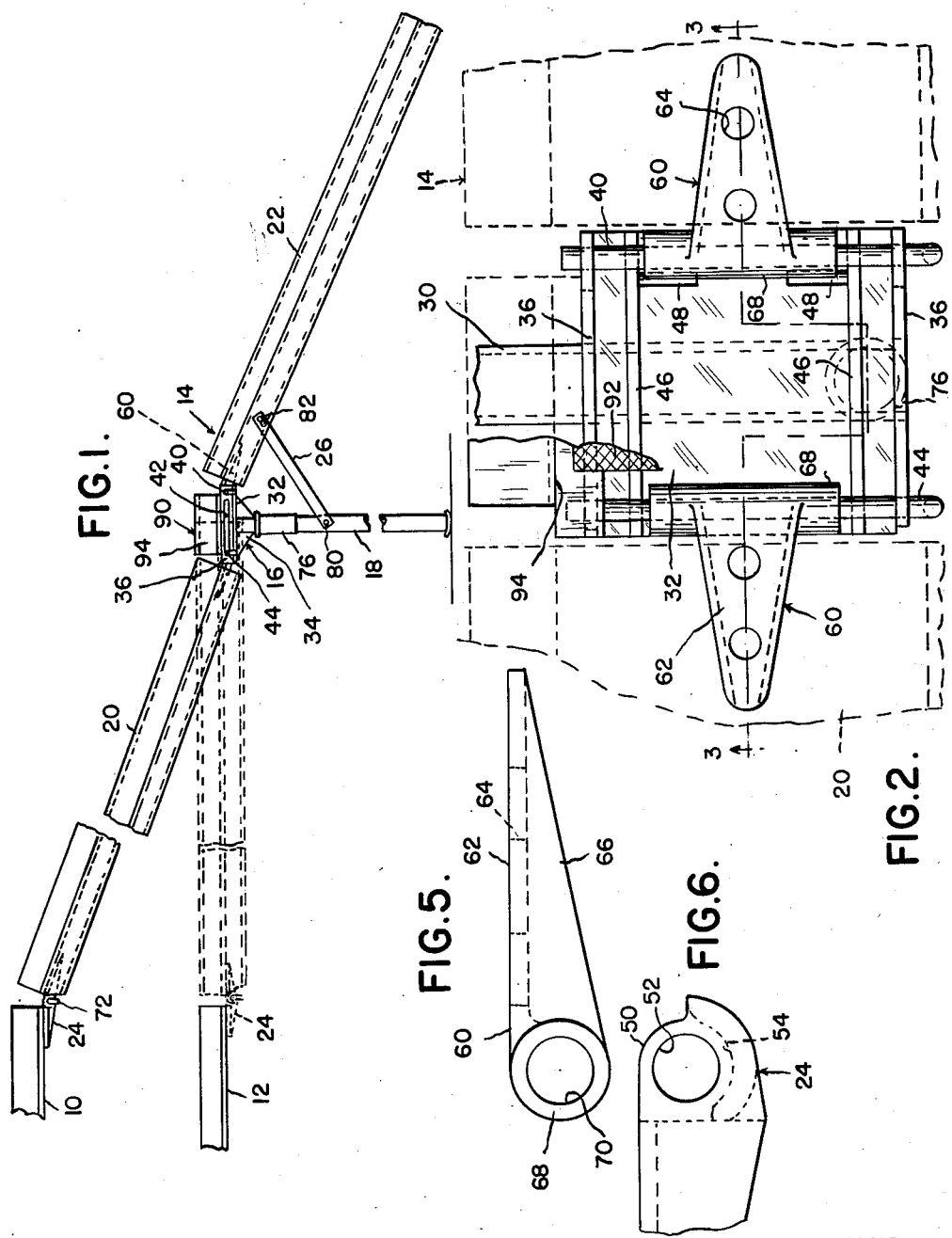
INVENTOR.
PHILIP J. PRESSLER
BY Whittemore,
Hulbert & Belknap
ATTORNEYS Oct. 6, 1953 P. J. PRESSLER 2,654,492
SKID ARRANGEMENT FOR HAULAWAY VEHICLES
Filed Dec. 28, 1950 2 Sheets-Sheet 2

INVENTOR.
PHILIP J. PRESSLER
BY Whittemore,
Hulbert & Belknap
ATTORNEYS

Patented Oct. 6, 1953

2,654,492

UNITED STATES PATENT OFFICE 2,654,492

SKID ARRANGEMENT FOR HAULAWAY VEHICLES

Philip J. Pressler, Dearborn, Mich., assignor to Whitehead & Kales Company, River Rouge, Mich., a corporation of Michigan Application December 28, 1950, Serial No. 203,085

9 Claims. (Cl. 214—85)

1

The present invention relates to a skid arrangement for haulaway vehicles.

A large proportion of automobiles are transported on motor vehicles, such for example as haulaway trailers. At the present time the ordinary motor vehicle used for transporting automobiles on the highway is a double deck arrangement. Conveniently, means are provided for driving or towing the automobiles for transit on and off the haulaway trailer under their own power. Accordingly, a skid is required leading from the ground to the motor vehicle and this skid necessarily includes an arrangement whereby its front end may be connected alternatively to the upper or lower deck of the vehicle.

In practice, the haulaway vehicle includes movable tracks in which the rear end of the upper track is vertically movable out of the way when an automobile is to be driven or otherwise moved onto the lower track of the vehicle. Accordingly, the rear ends of the upper and lower tracks need not be spaced apart a distance corresponding to the height of the automobile. However, there is a substantial difference between the height of the upper and lower track, and in practice, a common arrangement is one in which the rear end of the lower track is spaced approximately 40 inches above the ground and the rear end of the upper track is spaced approximately 80 inches above the ground when in position to receive an automobile. Moreover, for considerations involving the conservation of space, it is desirable for the rear ends of the upper and lower tracks to occupy the same vertical plane when in position to receive the automobile.

In general, the skid construction for driving automobiles onto the transport vehicle comprises an intermediate elevated support, a pair of ground tracks extending from the ground to the support, and a second pair of tracks extending from the support to the rear end of either the upper or lower vehicle tracks.

In order to permit movement of this second pair of tracks from a position in which their forward ends are connected to the rear ends of one of the vehicle tracks to a position in which they are connected to the rear ends of the other pair of vehicle tracks, the rear ends of this second pair of tracks are connected to the support for both sliding and swinging movement relative thereto. Thus for example, as the forward end of the second pair of tracks is moved from connection to the upper tracks of the vehicle to the lower tracks thereof, the rear end of this

2 second pair of tracks is caused to move rearwardly of the vehicle on the support.

At the present time the two pairs of tracks connected to the intermediate support are mounted for swinging movement relative thereto but the difficulties encountered in moving the forward or loading pair of tracks of the skid structure from the upper to the lower tracks of the vehicle or vice-versa, are such that in practice it is ordinarily found more convenient to disassemble the tracks and support and to reassemble them in the new position. When the present invention is practiced it is a simple matter to move each of the forward tracks of the skid structure from upper to lower position without disasssembly of the skid structure or other inconvenience.

The front end of the forward pair of tracks of the skid structure includes coupling means by means of which the tracks are interlocked with the rear ends of the tracks of the haulaway vehicle so that in either upper or lower position the skid structure provides a firm rigid support over which automobiles may be driven safely either in loading or unloading the haulaway vehicle.

With the foregoing general remarks in mind it is an object of the present invention to provide a skid structure characterized by the ease and facility with which it may be alternatively connected to the upper and lower tracks of a double deck haulaway vehicle.

It is a feature of the present invention to provide a skid structure including a pair of ground track sections pivoted to an intermediate support at their forward ends and a pair of loading track sections connected to the support both for sliding movement in a direction longitudinal of the track sections, and pivotal movement about an axis extending transversely of the track sections.

Other objects and features of the invention will become apparent as the description proceeds, especially when taken in conjunction with the accompanying drawings, wherein:

Figure 1 is a side elevation of the skid structure showing the forward or loading track sections connected to the upper vehicle track in full lines, and in dotted lines connected to the lower vehicle tracks.

Figure 2 is an enlarged fragmentary plan view showing the connection between the ground and loading track sections with the support.

Figure 5 is a side elevation of a male coupling member employed.

Figure 6 is a side elevation of a female coupling member employed.

Figure 3:
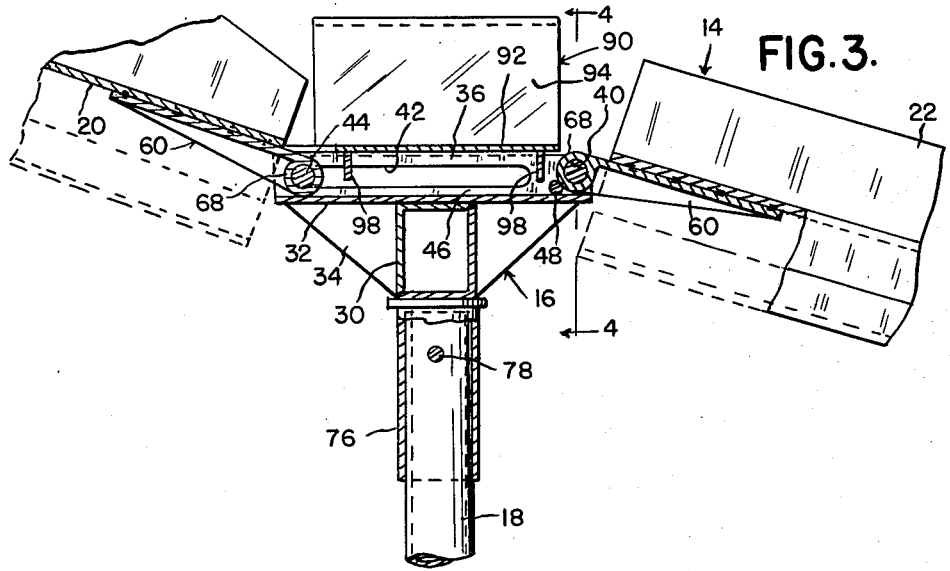
Figure 3 is a section on the line 3—3, Figure 2.

Referring now to the drawings, in Figure 1 there is illustrated an upper vehicle track 10, a lower vehicle track 12, and the improved skid structure indicated generally at 14. In this figure the skid structure comprises an intermediate support 16 retained in elevated position by a pair of supporting legs 18. The support 16 extends transversely and is connected at its forward side to a pair of vehicle track sections 20, and at its rear side to a pair of ground track sections 22.

The upper track 10 of the vehicle and the lower track 12 thereof are provided adjacent their rear ends with female coupling members 24, the details of which will subsequently be described. The rear end of the loading track sections 20 include a connection to the support 16 which provides for simultaneous swinging movement thereof and sliding movement relative thereto in a horizontal direction generally longitudinal of the track sections. The ground track sections 22 are pivoted to the rear side of the support 16 and include diagonal braces 26 which render the entire skid structure substantially rigid in assembled relation.

Figure 4:
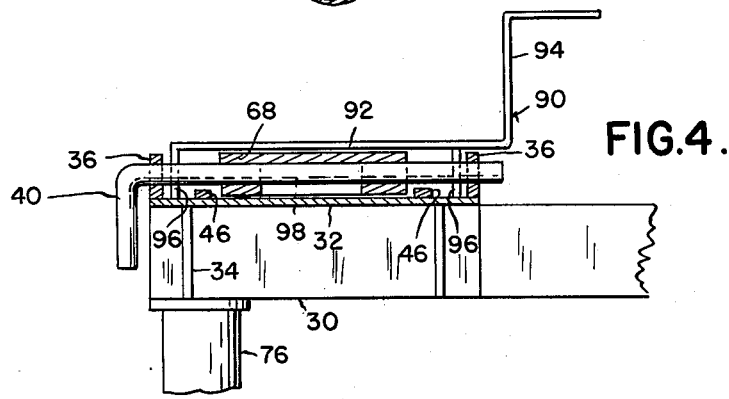
Figure 4 is a section on the line 4—4, Figure 3.

The support 16, as best seen in Figures 2, 3 and 4, includes a transverse beam 30 illustrated herein as composed of two angle irons welded together along their edges. Adjacent either end of the beam 30 are secured supporting plates 32 which are braced to the beam 30 by triangular gusset plates 34. At each edge of the supporting plate 32 there is provided an upstanding flange 36, these flanges having a pair of opposed circular openings adjacent their rear edge for the reception of pivot pins 40 and including a pair of opposed elongated slots 42 for the reception of pivot pins 44. Inwardly of the flanges 36, the plate 32 is further provided with a pair of relatively low rails 46 which assist in centralizing the tracks as will subsequently be described.

Extending transversely across the plates 32 are a pair of locating elements 48 whose function will subsequently be described.

Figure 7:
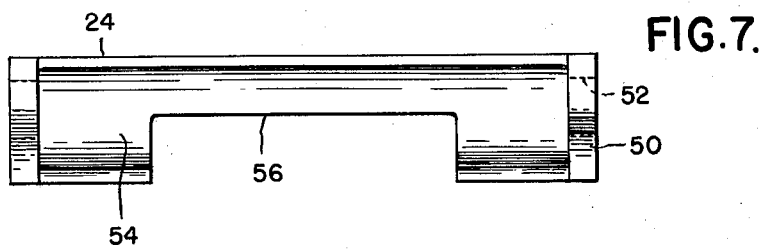
Figure 7 is a plan view of the female coupling illustrated in Figure 6.

The female coupling members 24 located at the rear of the track sections on the transport vehicle are illustrated in Figures 6 and 7 and include end webs 50, each of which is provided with a central opening 52 and an interconnecting concave supporting portion 54 which is cut away as indicated at 56 to provide for swinging movement of the male coupling member relative thereto without interference.

The male coupling member is illustrated at 60 in Figure 5 and comprises a flat strap 62 provided with openings 64 by means of which the strap is welded to the part carrying the coupling member 60. The strap is reinforced by webs 66 and at one end includes a cylindrical sleeve portion 68 having a through opening 70 formed therein.

The male and female coupling sleeves 60 and 24 are interconnected as best illustrated in Figures 5 and 6 which show the parts in separated position but in such position that they may be assembled by moving the male coupling member 60 downwardly until the sleeve portion 68 is supported on the supporting portion 54 of the female coupling member. This results in alignment of the openings 52 and 70 and the coupling is completed by passing a coupling pin 72 therethrough.

Obviously, when the loading track sections 20 are attached by proper assembly of the coupling members 24 and 60 the loading tracks are rigidly supported on the transport vehicle in such a manner that automobiles may be loaded or unloaded therefrom.

The loading track sections 20 are provided with identical male coupling members 60 at both ends. The male coupling members 60 at the rear end of the loading track sections cooperate with the support 16, as will now be described.

The cylindrical sleeve portion 68 of the coupling member rests upon the upper surface of the plate 32 between the locating rails 46. At this time the cylindrical opening 70 through the sleeve 68 is in alignment with the elongated slots 42 provided in the flanges 36. The parts are coupled together by inserting a coupling pin 44 through the elongated slots 42 and through the opening 70 in the sleeve 68. This obviously couples the loading track sections 20 to the support 16 for rocking or pivot movement about the axis of the pin 44. At the same time the pin 44 is slidable longitudinally of the elongated slots 42.

The forward end of the ground track sections 22 are also provided with male coupling members 60 which cooperate with the support 16 in the same manner as the coupling members on the loading track sections 20, except that in this case the pivot pins 40 extend through circular openings in the flanges 36. As a result of this the ground track sections 22 are mounted for pivot motion only with respect to the support 16.

In order that the skid structure may be easily demounted and carried on the automobile transport, it is arranged for separation into a plurality of component parts. The support 16 which includes the transverse beam 30, is provided adjacent either end with a downwardly extending socket 76 in which the upper end of the supporting legs 18 are detachably received. If desired, a coupling pin 78 may be provided to interlock the legs with the support. The braces 26 previously referred to are permanently pivoted to the legs 18 as indicated at 80 and include a detachable connection 82 with the ground track sections 22 which may take the form of pins on the ground track sections and pin receiving slots at the free ends of the braces 26. Obviously, track sections 20 and 22 may be separated from the support and from the vehicle by the withdrawal of the pivot pins 72, 44, and 40.

In order to bridge the coupling structure when the loading track sections 20 are in the elevated position illustrated in full lines in Figure 1, a pair of removable insert assemblies 90 are provided. These insert assemblies comprise a tread portion 92, an upstanding guide portion 94, and a pair of depending flanges 96 which in use rest upon the upper surface of the plate 32. Preferably, the depending flanges 96 are interconnected and braced by a pair of cross flanges 98. With the parts in the position illustrated in Figure 2, the insert assemblies 90 provide a tread surface spanning the forward end of the ground track section 22 and the rear end of the loading track section 20. When the loading track section 20 is moved to a position in which it connects with the lower track of the automobile transport the insert 90 is removed, since at this time the rear end of the loading track section 20 moves rearwardly of the support into proximity to the forward end of the ground track section 22.

Referring again to Figure 1, it will be observed that the rear end of the loading track section 20 moves from a forward position in which the pivot pin 44 is located adjacent the forward end of the elongated slot 42, to a rear position in which the pivot pin 44 approaches the rear end of the slot 42. This longitudinal sliding movement provided for the rear end of the loading track sections 20 permits the forward ends of the loading track sections 20 to be moved from the upper position to the lower position in a vertical plane without requiring the movement of the support 16 or the ground track sections 22. Thus, it is a simple matter for the operator to move the loading track sections 20 separately from upper to lower position. This is accomplished by first lifting off the insert 90. Thereafter, the operator removes the pivot pin 72 which connects the male and female coupling members at the forward ends of the loading track sections. Thereafter, the forward ends of the loading track sections 20 may be lowered vertically until the coupling members at the forward end of the loading track sections seat in the seat provided in the female coupling members. Thereafter, coupling pins 72 are inserted. This movement of the forward end of the loading track sections is of course accompanied by a rearward sliding of the coupling pins 44 in the elongated slots 42.

The function of the locating members 48 which are secured on the upper surface of the plates 32 of the support 16 is to locate the sleeves 68 of the coupling members 60 attached both to the rear end of the loading track 20 and to the forward end of the ground track sections 22 in proper position to receive the pivot pins 44 and 40. To assemble the ground track sections to the support the operator lets the sleeves 68 of the coupling members 60 rest upon the upper surface of the plate 32 and moves them into abutment with both of the locating members 46. At this time the opening in the sleeve 68 is in proper alignment with the circular openings in the flanges 36 and the coupling pin 40 may be inserted directly. The forward end of the locating members 46 serve as guides for the rear end of the loading tracks 20 while being moved in longitudinal direction.

The present construction greatly facilitates the connection of the skid structure selectively to the upper and lower tracks of the transport vehicle. The arrangement provides for the ready separation of the component parts of the skid structure for convenient storage on the transport vehicle. In either position of use, the skid structure is strongly supported and provides a safe and convenient structure for driving automobiles onto and off of a transport vehicle.

The drawings and the foregoing specification constitute a description of the improved skid arrangement for haulaway vehicles in such full, clear, concise and exact terms as to enable any person skilled in the art to practice the invention, the scope of which is indicated by the appended claims.

What I claim as my invention is:

1. In combination, an automobile carrying vehicle having upper and lower tracks the rear ends of which are vertically spaced and include upwardly facing support and coupling portions, a skid comprising an intermediate elevated support, ground engaging legs on said support holding it at a fixed distance from the ground, ground track sections connected at one end to said support and resting on the ground at the other end, pivot means connecting said support and ground track sections and effective with said legs to stabilize said support against vertical or horizontal movement, loading track sections having at their forward ends coupling members selectively supported upon the support and coupling portions at the rear ends of said upper and lower tracks, and coupling means for connecting the rear ends of said loading track sections to said intermediate elevated support for vertical swinging movement about axes adjacent the rear ends of said loading track sections and for horizontal sliding movement longitudinally of said loading track sections, whereby said loading track sections may be moved between said upper and lower vehicle tracks without moving said intermediate elevated support or said ground track sections.

2. A skid comprising a pair of ground engaging legs, a cross beam connected at its ends to the tops of said legs, horizontal plates carried at opposite ends of said beam, a pair of vertical flanges at the sides of each of said plates, said flanges having aligned openings in each pair of flanges, and aligned elongated horizontally extending slots, a pair of ground track sections having one end resting on the ground and one end pivotally secured to said flanges at said aligned openings and cooperating with said legs to support said beam immovable in use, a pair of loading track sections having one end slidably supported on said plates and pivot means extending into said elongated slots.

3. A skid comprising a cross beam having depending sockets adjacent its opposite ends, supporting posts removably received in said sockets, horizontal plates carried at opposite ends of said beam, a pair of vertical flanges at the sides of each of said plates, said flanges having aligned openings in each pair of flanges, and aligned elongated horizontally extending slots, a pair of ground track sections having one end resting on the ground and one end pivotally secured to said flanges at said aligned openings, said ground track sections and said legs cooperating to hold said beam immovable in use, a pair of loading track sections having one end slidably supported on said plates and pivot means extending into said elongated slots.

4. A skid as defined in claim 3 comprising stabilizing means connecting said posts and said ground track sections.

5. A skid for selective connection with the rear ends of the upper and lower tracks on an automobile carrying vehicle comprising an elevated support including ground engaging legs, ground track sections pivoted to said support at the forward ends thereof for movement about fixed axes, stabilizing means connecting said legs and ground track sections, said stabilizing means, ground track sections and legs cooperating to hold said support immovable in use, loading track sections, and means connecting the rear ends of said loading track sections to said elevated support for swinging movement about horizontal axes extending transversely to the length of said loading track sections and for horizontal sliding movement longitudinally of said loading track sections.

6. In combination, an automobile carrying vehicle having upper and lower tracks the rear ends of which are vertically spaced and include upwardly facing support and coupling portions, a skid comprising an intermediate elevated support, ground track sections connected at one end to said support and resting on the ground at the other end, means connecting said support and ground track sections and effective to stabilize said support, loading track sections having at their forward ends coupling members selectively supported upon the support and coupling portions at the rear ends of said upper and lower tracks, and coupling means for connecting the rear ends of said loading track sections to said intermediate elevated support for vertical swinging movement about axes adjacent the rear ends of said loading track sections and for horizontal sliding movement longitudinally of said loading track sections, said coupling means comprising vertical flanges at the sides of said intermediate support, said flanges having elongated horizontally extending slots, the rear ends of said loading track sections having depending tubular elements thereon resting upon said intermediate support and slidably supporting the weight of said loading track sections, and coupling pins extending through said slots and said tubular elements whereby said loading track sections may be moved between said upper and lower vehicle tracks without moving said intermediate elevated support or said ground track sections.

7. Structure as defined in claim 6 in which said intermediate support has guide rails thereon spaced inwardly from and parallel to the side flanges, said depending tubular elements being guidedly received between said rails.

8. Structure as defined in claim 6 comprising removable bridges having horizontal tread sections to span the space between the forward end of said ground track sections and the rear end of said loading track sections.

9. Structure as defined in claim 8, said bridges having depending flanges resting upon said intermediate supports adapted to elevate the tread sections thereof in substantial alignment with tread portions of said ground and loading track sections.

PHILIP J. PRESSLER.

References Cited in the file of this patent

UNITED STATES PATENTS

| Number | Name | Date |
|---|---|---|
| 479,533 | Schultz | July 26, 1892 |
| 1,699,882 | Ferguson | Jan. 22, 1929 |
| 2,004,439 | Judd | June 11, 1935 |
| 2,100,694 | Judd | Nov. 30, 1937 |
| 2,473,830 | Stuart | June 21, 1949 |
| 2,492,829 | Baker | Dec. 27, 1949 |
| 2,595,533 | Mullen et al. | May 6, 1952 |